United States Patent [19]
Kantrowitz et al.

[11] 3,818,700
[45] June 25, 1974

[54] RAM JET POWERED BY A LASER BEAM

[75] Inventors: Arthur R. Kantrowitz, Cambridge; Richard J. Rosa, Everett, both of Mass.

[73] Assignee: Avco Corporation, Cincinnati, Ohio

[22] Filed: Oct. 20, 1972

[21] Appl. No.: 299,589

[52] U.S. Cl. ................................................ 60/203
[51] Int. Cl. .................................................. G21d
[58] Field of Search ............... 60/203, 270; 432/29; 219/121 LM

[56] References Cited
UNITED STATES PATENTS

| | | | |
|---|---|---|---|
| 2,570,629 | 10/1951 | Anionnaz et al. | 239/265.33 |
| 3,034,294 | 5/1962 | Brown | 60/207 |
| 3,143,401 | 8/1964 | Lambrecht | 48/180 |
| 3,355,891 | 12/1967 | Rhodes | 60/270 |
| 3,392,527 | 7/1968 | Gilmour, Jr. et al. | 60/202 |
| 3,416,319 | 12/1968 | Rubenstein | 60/202 |
| 3,715,110 | 2/1973 | Jensen et al. | 60/203 |

Primary Examiner—Samuel Feinberg
Attorney, Agent, or Firm—Charles M. Hogan; Melvin E. Frederick

[57] ABSTRACT

A ram jet vehicle is powered in flight by laser beam radiation which heats the ram jet gas in the vehicle combustion chamber or exhaust nozzle. The beam is incident upon the vehicle or a part thereof that directs the radiation to the ram jet gas in the combustion chamber or exhaust nozzle. The gas is sufficiently absorptive of the radiation either intrinsically or because of added material to absorb substantial power from the beam and thereby add to the gross thrust of the jet gas.

8 Claims, 7 Drawing Figures

PATENTED JUN 25 1974 3,818,700

PATENTED JUN 25 1974 3,818,700
SHEET 2 OF 2

RAM JET POWERED BY A LASER BEAM

DISCLOSURE

This invention relates to air breathing jet aircraft and more particularly to such aircraft which derive at least a part of the jet power from radiation beamed to the aircraft.

Heretofore, it has been proposed to power an aircraft by microwave radiation beamed to the aircraft from a station on the earth. One such proposal includes apparatus on the aircraft for converting the microwave power received at the aircraft into electrical power which is used to energize motors that sustain the craft in flight. The craft is a helicopter and the motors drive the helicopter blades.

The pattern of radiation from a microwave antenna is such that interception of substantially all the microwave power at a range of 50 miles requires a receiving antenna measuring about a mile across. Thus, within practical limits only a small friction of the total microwave radiation beamed can be intercepted and used at the vehicle.

In accordance with the present invention, an air breathing vehicle such as a ram jet is powered in flight by laser radiation beamed to the vehicle from a remote point such as from the ground. The coherent nature of laser radiation and optical wavelength permits the laser beam to be focused on the vehicle and so substantially all the radiation generated is intercepted by the vehicle and can be focused on a relatively small area of the vehicle where the energy of radiation can be converted directly to thermal energy. This highly intense concentration of radiation at optical wavelength permits a highly efficient conversion of the radiation into propulsive energy and avoids the necessity of converting first to electrical energy as would be encountered with the proposed schemes using microwave radiation beamed to a vehicle as mentioned above.

The wavelength of radiation from all practical lasers is many orders of magnitude less than the wavelength of the highest frequency microwave systems. This factor and the coherent nature of laser radiation permits beams of laser radiation of relatively large aperture to be projected with an extremely small divergence angle and so substantially all of the laser beams can be intercepted at a useful range by a target area, which can be contained on a practical air breathing craft. Laser sources operating at for example, 10.6 micron wavelength, emit radiation of very high energy density with an almost plane and constant wave front over a sizable aperture and so the diffraction angle is limited and is proportional to the ratio of wavelength to aperture diameter. The diffraction angle establishes an ultimate limit on range for power transmission of such laser beams to a target contained on a practical air breathing craft. This ultimate range limit, however, is many orders of magnitude greater than possible with microwave beams. Thus, even where no refocusing of the laser beam is accomplished at the vehicle, it is feasible to beam substantially all the energy from a 10.6 micron wavelength laser to a vehicle at a distance of 50 to 60 miles. This range increases to about 2,000 to 3,000 miles for a 0.3 micron wavelength laser.

It is an object of the present invention to provide a method and apparatus for carrying out the method of powering an air breathing vehicle such as a ram jet vehicle at least in part by coherent radiation beamed to the vehicle from a source remote from the vehicle such as a source on the ground.

It is another object of the present invention to provide a ram jet vehicle equipped to intercept a beam of intense coherent radiation and convert the energy from said beam into thermodynamic propulsive energy.

It is another object of the present invention to provide an air breathing jet propelled vehicle in which the propulsion gas is heated substantially by an intense beam of coherent radiation directed to the vehicle from a remote point.

It is a further object to provide at such an air breathing vehicle in which the incident radiation is directly impingent upon the jet gas to accomplish the heating of such gas by absorption of the radiation.

It is a further object to provide such a vehicle in which the incident radiation is focused at the vehicle and the focused radiation is absorbed by gaseous material that constitutes at least a part of the vehicle propulsion gas.

These and other objects of the present invention will be apparent in view of the following specific description of the best known uses of the invention taken in conjunction with the figures in which.

In order to beam sufficient energy a distance of 50 miles or more from the ground to an air breathing vehicle, it is quite clear that the level of energy or power beamed must be very high, the beam must be very narrow, and there must exist at the vehicle a highly efficient apparatus for intercepting substantially all of the beamed radiation and converting it into thrust. Heretofore, these problems have not been solved by beaming microwave to a vehicle as discussed above. However, the development of laser technology now provides a tool whereby these requirements of high energy level, narrow beam width and efficient conversion of radiated energy into thrust becomes feasible, using the techniques disclosed in the present invention. For example, the development of powerful continuous $N_2$-$CO_2$ lasers which produce a beam of highly coherent radiation which is essentially monochromatic at 10.6 micron wavelength provides a tool which can be used in a system to power an air breathing vehicle a distance of 50 miles or more from the laser. The $N_2$-$CO_2$ laser promises to provide the high power level as there is no real physical limitation which would prevent such a laser or array of such lasers from beaming thousands of megawatts of power to an air breathing vehicle even at distances of 50 miles or more from the laser. The beam from such a laser or array of lasers can be very narrow, as it is diffraction limited and need have an aperture of only about one half a meter in diameter to provide a beam at 50 to 100 miles with very little spread, and so substantially all of this beam could be intercepted by the vehicle. Thus, the first two requirements of the system are within the state of the art as it exists today.

Figure 7:
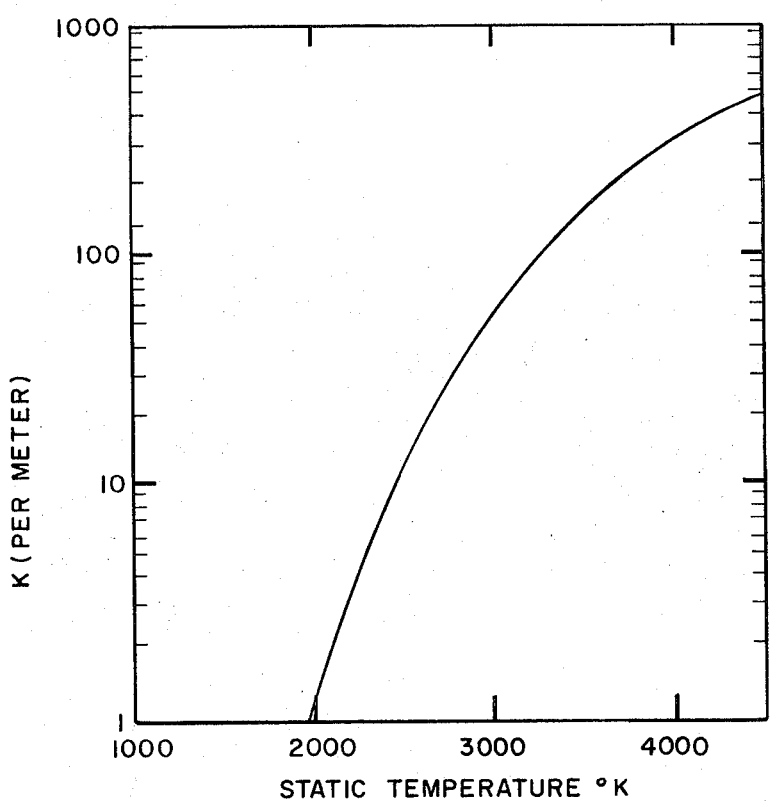
FIG. 7 is a curve of an absorption coefficient of the jet propulsion gas versus the gas temperature.

The efficient capture of the radiated laser energy and conversion of this energy into thrust, however, poses a considerable problem and it is to that problem that the present invention is primarily directed. FIG. 7 is a plot of the absorption coefficient as a function of gas temperature illustrating the absorption of 10.6 micron radiation in air which is seeded by a small percent of alkali metal vapor such as potassium or sodium. Clearly the absorption length is a very strong function of the temperature of the gas at the pressure indicated which is 10 atmospheres. This relationship between absorption coefficient and temperature at 10 atmospheres is very convenient for an air breathing vehicle, because such vehicles typically operate at 10 atmospheres of presure in the combustion chamber and the exhaust gas is typically at about 2500° K. It can be seen from the curve in FIG. 7 that at 2,500° K and 10 atmospheres, air seeded with a tenth atmosphere partial pressure of potassium vapor exhibits an absorption coefficient of about 13. Furthermore, as the gas heats to 3,000° K the absorption coefficient rises to about 60. The ratio of incident radiation power denoted $P_1$ at the point where it is incident upon the absorbing medium to the beam power $P_X$ at some X meters into the medium is given by the following expression:

$$P_X/P_1 = e^{-KX}$$

where K is the absorption coefficient per meter. Clearly where the ratio of $P_X/P_1$ is about one half and the absorption coefficient is 13, the X is about 1/13 of a meter which is only a few centimeters. Thus, it can be seen that within a distance of less than a meter substantially all of the incident laser radiation at 10.6 microns is absorbed by air at 2,500°K and 10 atmospheres seeded as described with vapor of an alkali metal such as potassium. Thus, a technique is found whereby all the requirements mentioned above for a successful radiation beam powered air breathing vehicle can be met using a high power laser or array of lasers radiating at 10.6 microns wavelength.

Figure 1:
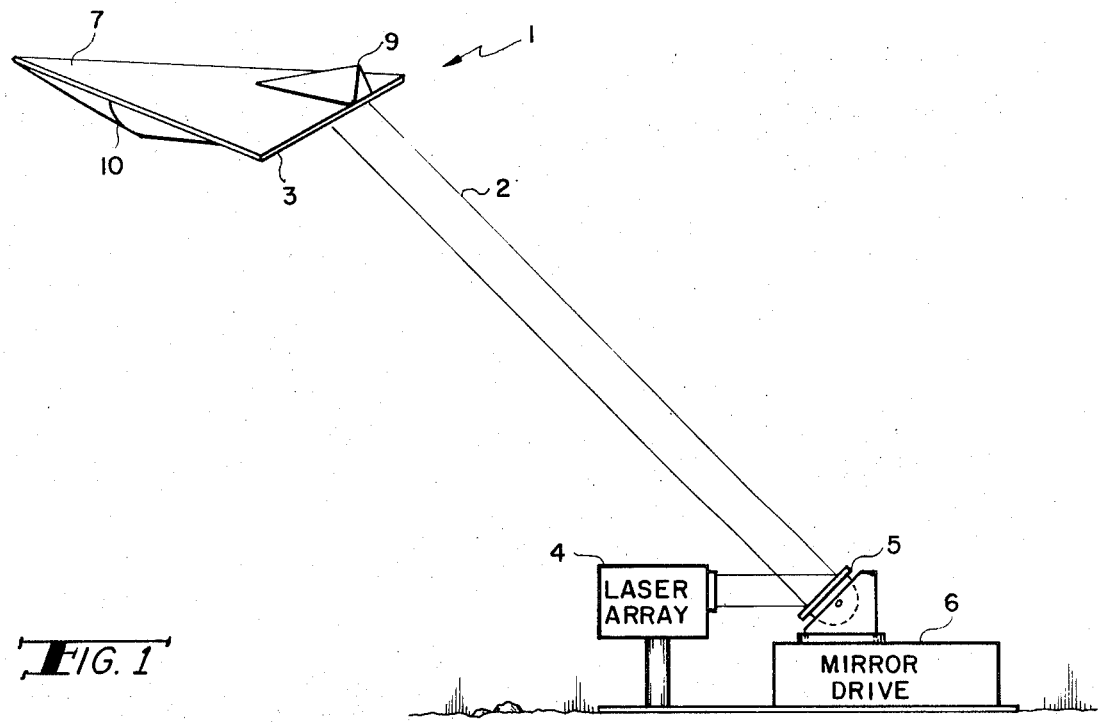
FIG. 1 is a pictorial representation of a system including an air breathing vehicle powered at least in part by a laser beam from a laser system on the ground.

FIG. 1 is a pictorial diagram showing an air breathing vehicle such as a ram jet to which is beamed intense laser radiation from a ground source. The ram jet, denoted 1, intercepts the laser beam 2 at the exhaust nozzle or duct 3 of the ram jet and so the ram jet must be oriented in flight to present this target to the laser beam. In addition the beam must track the ram jet in flight to continue to provide propulsive power to the jet. For this purpose, the laser system on the ground may include a bank of lasers 4 at a stationary location which direct the beam to a tracking mirror 5 which is physically moved by a tracking drive system 6. A telemetering system functioning between the tracking drive 6 and beam detectors on the vehicle control the mirror 5 so it directs the laser beam precisely onto the target which is the exhaust nozzle duct 3 of the ram jet. Instrumentation carried by the vehicle for detecting the incident laser impingent on the exhaust nozzle duct produces signals indicative of any deviation of the beam from a target area on the duct. Such instrumentation is well within the state of the art and need not be disclosed in any substantial detail herein. Furthermore, a telemetering system including a transmitter on the vehicle for transmitting the signals from the detectors to a ground receiver system that decodes and feeds this information to the mirror drive system 5, are systems which are also well in the art and need not be described in any substantial detail herein. It is sufficient to suggest that the whole system for controlling the mirror so that it directs the laser beam onto the target at the exhaust duct of the ram jet is a closed loop null type servo loop system. Since the deflecting mirror 5 can be relatively light weight, this servo loop can be made to respond easily to follow the flight path of a typical ram jet vehicle and so maintain the laser beam precisely on target at the exhaust duct of the vehicle.

Figure 2:
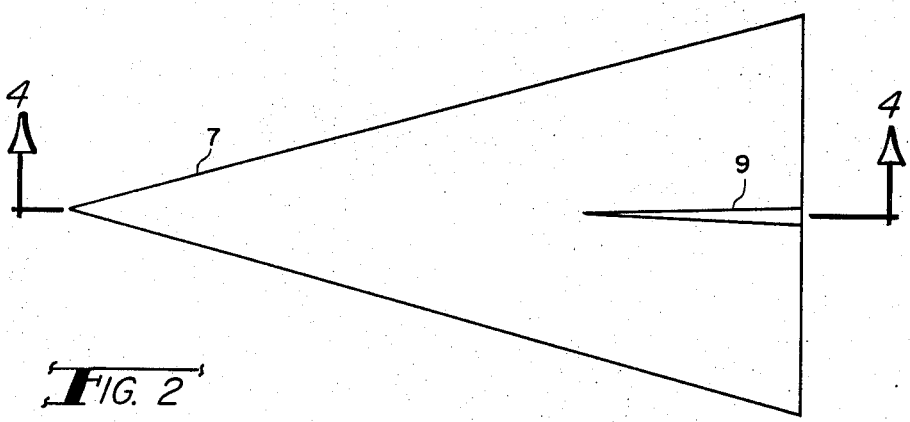
FIGS. 2 and 3 are top and bottom views of the air breathing vehicle which is a ram jet.
Figure 4:
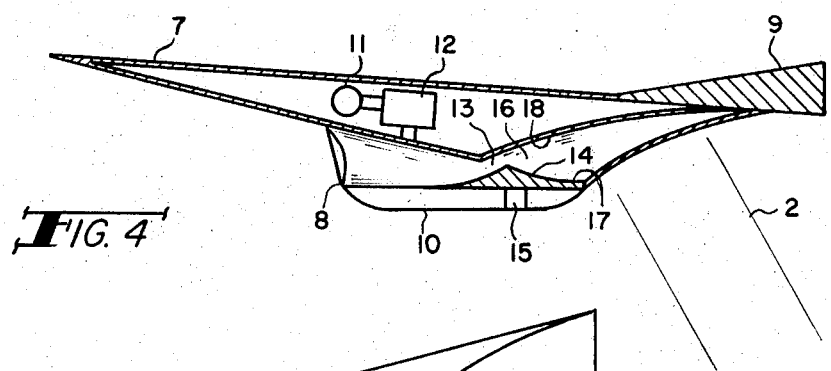
FIG. 4 is a representative cross-section view of the vehicle showing the general contour of the inlet air duct, heating or combustion chamber, the convergent nozzle and the divergent exhaust duct which functions also to intercept the incident radiation and direct it to the heating or combustion chamber for absorption by the propulsion gas flowing therethrough.
Figure 3:
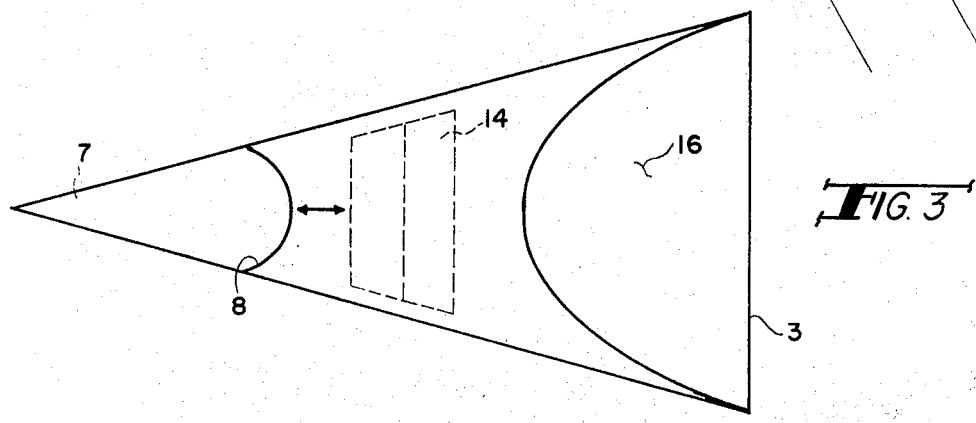
Figure 5:
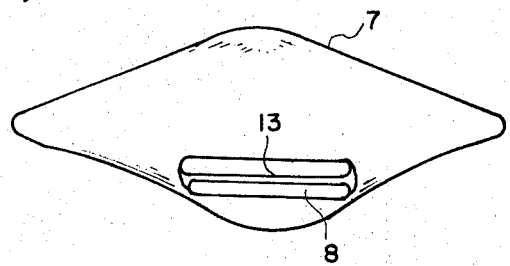
FIGS. 5 and 6 are front and rear views of the vehicle.
Figure 6:
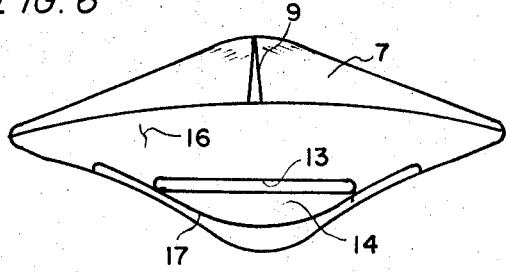

FIGS. 2 and 3 show the top and bottom views of the ram jet vehicle 1 which is designed for supersonic flight having a nose cone 7, inlet air duct 8, exhaust nozzle 3, and a vertical stabilizer 9. The nose cone 7 is an extension of the fuselage 10 which contains the various controls for the vehicle, the aforementioned telemetering system and radiation detectors for sensing the incident laser beam 2 and a container and injection system for the seed material which may be an alkali metal vapor that is added to the jet gas to enhance its absorption of the incident laser radiation. This system may include a tank or container 11 for the seed material and an injection system 12 which feeds the seed material into the jet ducting in the fuselage of the vehicle as described in more detail hereinbelow.

The jet ducting inside the fuselage 10 of the vehicle includes an air inlet 8 so positioned and designed with relationship to the nose cone 7 to capture the maximum air flow, and produce minimum drag, in consideration of the aerodynamic performance of the vehicle. From the inlet 8, the duct leads to a throat or neck at 13 and so the duct converges from 8 to 13. From the throat 13 to the exhaust nozzle or outlet at 3, the duct diverges and so there is provided from the inlet 8 to the exhaust or outlet 3 a convergent-divergent jet gas flow path in which is produced a net forward thrust that propels the craft.

The throat 13 may be varied to enhance thermodynamic and aerodynamic performance of the vehicle by varying in a longitudinal direction the section of 14 of the internal duct. When this section is moved longitudinally toward the nose of the vehicle the area of the throat closes and when it is moved aft, the area of the throat increases. A drive mechanism 15 in the fusilage positions the throat section 14. Thus, a mechanism is provided for throttling the jet flow through the ram jet vehicle. As an alternate technique for varying the throat 13, a mechanism could be provided moveable transverse to the flow of gas to close and open the throat.

Near the throat 13 there may be provided a combustion chamber area 16 in which conventional chemical combustion in the inlet air occurs heating the air to the temperature range about 2,500°K. A small mol percent of an alkali metal vapor carried in tank 11 may be added at the combustion chamber or upstream or downstream of the combustion chamber to enhance absorption by the gas of the incident laser radiation at 10.6 microns wavelength. It is suggested that conventional combustion be employed to bring the gas to this temperature range under those flight conditions where the vehicle velocity is not sufficiently high to produce the temperature of 2,500°K by the ram heat effect.

The configuration of the duct from inlet 8 to the throat 13 depends upon whether combustion is at subsonic or supersonic gas flow in the combustion chamber. At low flight mach number, combustion in a ram jet is usually subsonic. At intermediate mach number, combustion may be subsonic or supersonic and at high flight mach number, it is supersonic.

The incident laser beam radiation 2 is incident upon the contoured surface 17 in the divergent jet exhaust duct 3 and is reflected by surface 17 toward the throat 13 of the jet duct. The curvature of surface 17 is such the incident laser radiation is substantially focused and so the laser radiation energy from the beam is concentrated for absorption by the jet gas near the throat 13. Thus, the incident radiation heats the jet gas before the jet gas expands in the divergent exhaust nozzle 3 defined by the upper wall 17 and the lower wall 18 of the exhaust nozzle.

The very high absorption coefficient imparted to the jet gas by the addition of a very small amount of alkali metal vapor such as potassium insures that substantially all of the intercepted laser radiation power goes into heating the jet gas and so increases the gross jet thrust imparted to the vehicle. The efficiency of utilization of the incident laser beam radiation is optimised by the focusing effect of the surface 17 that forms part of the divergent exhaust nozzle 3 within the fusilage of the ram jet. This focusing affect concentrates the laser beam energy just downstream of the throat 13 where the gas pressure is higher than at the throat.

The contour of the surface 17 may be generally parabolic and so it reflects the incident radiation to the same area just downstream of the throat 13 independent to an extent of the angle of incidence of the laser radiation to the longitudinal axis of the vehicle. While the contour of the surface 17 is significant and quite determinative of the extent to which the incident laser beam is concentrated downstream of the throat 13, it is perhaps more important that the surface be highly reflective of the 10.6 micron radiation. In addition, the surfaces 17 and 18 define the divergent exhaust nozzle and so the shape of these surfaces determine to some extent the efficiency with which the exhaust nozzle converts the expanding gas to gross jet thrust. Clearly, in practice a compromise between these effects is strived for to realize the optimum efficiency of overall propulsion of the vehicle in consideration of its aerodynamic and thermodynamic requirements and its mission.

In accordance with the specific embodiment of the present invention described herein, particularly where the inlet air is not heated by conventional chemical combustion near the throat 13, it is necessary that the air be seeded to enhance absorption of the incident laser radiation at 10.6 microns. In this case, it is suggested that the seeding material be an alkali metal vapor such as potassium. It should be understood, however, that chemical combustion of the inlet air with fuel carried on board the vehicle can add combustion products to the gas such that the absorption coefficient is sufficiently high that the combustion products in the gas absorb substantially all the incident laser radiation without the need for adding an alkali metal seed material.

The $CO_2$-$N_2$ laser is suggested herein because these lasers have demonstrated high power capacity and a practical seeding material, an alkali metal vapor, in minute quantities in air is known to provide the very high absorption coefficient which makes absorption of the incident laser radiation efficient. Other lasers providing intense beams at much shorter wavelengths than 10.6 microns could also be used and perhaps yield greater advantage. Since the range at which a laser beam can be focused on a spot of given diameter is an inverse function of the wavelength, the shorter the wavelength, the greater the potential range. As lasers of shorter wavelength prove to be suitable for the use described herein, seeding materials for insuring high absorption of the radiation from these lasers could be identified and so other combinations of lasers and seeding materials could be substituted for the laser and seeding material described herein without deviating from the spirit and scope of the invention as set forth in the appended claims.

What is claimed is:

1. In a ram jet powered supersonic vehicle having a convergent inlet air duct for receiving and directing air to throat means, combustion chamber means for receiving air from said throat and providing ram jet gases at about at least 2500°K, and a divergent exhaust nozzle for receiving and expanding said heated ram jet gases to produce thrust, means for further heating said heated ram jet gases in said exhaust nozzle to increase the gross thrust produced by said ram jet gases flowing through said throat means comprising:
   a. first means including a first surface forming an integral part of said divergent nozzle for receiving laser beam radiation which is incident upon the vehicle from a point remote from said vehicle, said first surface being reflective to said incident laser beam radiation and contoured to substantially direct said laser beam radiation incident on it toward said throat means;
   b. second means for varying the cross section of said throat means; and
   c. third means for adding to the ram jet gases an alkali metal substantially increasing the absorption of the incident laser beam radiation by said ram jet gases.

2. In a ram jet vehicle, as in claim 1, wherein:
   a. the ram jet gas begins as air entering the vehicle at an inlet diffuser;
   b. the gas from the inlet flows through a converging duct to said throat and from said throat through said exhaust nozzle to an exit; and
   c. the ram jet gas is heated by the incident radiation in the exhaust nozzle.

3. A ram jet vehicle, as in claim 2, and additionally including:
   a. fourth means carried by said vehicle and associated with said first means for detecting incident laser beam radiation on said first means; and
   b. transmitting means actuated by said fourth means for transmitting back to said source of laser beam radiation signals proportional to the amount of laser beam radiation incident on said first means.

4. In a ram jet vehicle, as in claim 2, wherein:
   a. the added alkali metal is added to the ram jet gas downstream of the throat.

5. A ram jet vehicle, as in claim 2, and additionally including:
a. means for adding a fuel to the entering air; and
b. means for initiating combustion of said fuel near the throat whereby the exhaust gas is heated to its final temperature partially by said combustion and partially by absorption of the incident laser beam radiation.

6. In a ram jet vehicle, as in claim 5, wherein:
a. the added alkali metal is added to the ram jet gas downstream of the throat.

7. In a ram jet vehicle, as in claim 5, wherein:
a. the added alkali metal is added to the ram jet gas upstream of the throat.

8. In a ram jet vehicle, as in claim 1, wherein:
a. the wavelength of the laser beam radiation is about 10.6 microns and the alkali metal is potassium.

* * * * *